US011966720B2

(12) United States Patent
Fox et al.

(10) Patent No.: US 11,966,720 B2
(45) Date of Patent: Apr. 23, 2024

(54) MODULAR COMMAND INTERFACE FOR APPLICATION INTEGRATION

(71) Applicant: MASTERCARD TECHNOLOGIES CANADA ULC, Vancouver (CA)

(72) Inventors: Justine Celeste Fox, Pitt Meadows (CA); Marc Grimson, Ithaca, NY (US); Christopher Waddell, Vancouver (CA); Chelsea Urquhart, Vancouver (CA); Leena Ruhela, Port Coquitlam (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 157 days.

(21) Appl. No.: 17/527,419

(22) Filed: Nov. 16, 2021

(65) Prior Publication Data

US 2022/0156048 A1 May 19, 2022

Related U.S. Application Data

(60) Provisional application No. 63/114,877, filed on Nov. 17, 2020.

(51) Int. Cl.
*G06F 8/30* (2018.01)
*G06F 9/455* (2018.01)
(Continued)

(52) U.S. Cl.
CPC ............ *G06F 8/30* (2013.01); *G06F 9/45512* (2013.01); *G06F 8/65* (2013.01); *G06F 9/44505* (2013.01)

(58) Field of Classification Search
CPC .......... G06F 8/30; G06F 8/65; G06F 9/45512; G06F 9/44505
(Continued)

(56) References Cited

U.S. PATENT DOCUMENTS

| 2014/0282495 | A1* | 9/2014 | Chico de Guzman Huerta et al. ............... G06F 8/61 717/177 |
| 2018/0013662 | A1 | 1/2018 | Salam et al. |
| 2019/0052549 | A1* | 2/2019 | Duggal et al. ...... H04L 41/5019 |

OTHER PUBLICATIONS

International Search Report and Written Opinion for Application No. PCT/CA2021/051620 dated Jan. 19, 2022 (7 pages).

* cited by examiner

*Primary Examiner* — Wei Y Zhen
*Assistant Examiner* — Mohammed N Huda
(74) *Attorney, Agent, or Firm* — Michael Best & Friedrich LLP

(57) ABSTRACT

Embodiments described herein provide for structured command line input for application integration such that application programming interface (API) integration is simplified for end users. The embodiments described herein use OpenAPI specifications to map specification paths (or endpoints) to a command line interface (CLI) command structure automatically. Accordingly, the embodiments described herein enable an end user to run CLI commands within the end user's environment to accomplish application integration without the need for a technician to write configuration instructions for each type of user device. Additionally, the embodiments described herein enable efficient product integration at a larger scale as well as the ability to ad hoc add new solutions or applications based on, for example, a single line of CLI input. By providing a robust, modular CLI on multiple end user devices, each end user device may independently integrate with an application associated with the device without complex application integration.

14 Claims, 5 Drawing Sheets

(51) Int. Cl.
*G06F 8/65* (2018.01)
*G06F 9/445* (2018.01)

(58) Field of Classification Search
USPC .......................................................... 717/106
See application file for complete search history.

MODULAR COMMAND INTERFACE FOR APPLICATION INTEGRATION

CROSS-REFERENCE TO RELATED APPLICATIONS

This application claims priority to U.S. Provisional Patent Application No. 63/114,877 filed Nov. 17, 2020, the entire contents of which is incorporated by reference herein.

FIELD

Embodiments described herein relate to a modular command interface for application integration, and, more particularly, to a modular command interface providing a structured command line input for application integration.

BACKGROUND

Conventional application integration generally involves modifying application code or rebuilding an application and then redeploying an application. The conventional application integration process is a time consuming and development heavy process that may take up to, for example, six months before the application integration process is complete. Accordingly, the conventional application integration process may result in a barrier for an end user wanting to adopt or integrate with a product, application, or solution.

SUMMARY

Embodiments described herein provide for structured command line input for application integration such that application programming interface (API) integration is simplified for end users. The embodiments described herein use OpenAPI specifications to map specification paths (or endpoints) to a command line interface (CLI) command structure automatically. Accordingly, the embodiments described herein enable an end user to run CLI commands within the end user's environment to accomplish application integration without the need for a technician to write configuration instructions for each type of user device. Additionally, the embodiments described herein enable efficient product integration at a larger scale as well as the ability to ad hoc add new solutions or applications based on, for example, a single line of CLI input. Multiple end user devices, being provided with a robust, modular CLI, may independently integrate with an application associated with the device without complex application integration. For example, the modular CLI is configured to submit a request to a background service for configuration of the modular CLI according to an OpenAPI specification in response to a line of modular CLI input. The backend service may respond to the request with a file (e.g. a yaml or json file) containing paths of the requested OpenAPI specification. In response, the modular CLI can interpret and execute the file as configuration instructions, automatically mapping the API specification paths in the file to structured command line inputs associated with a particular application, and configuring the modular CLI to accept and execute the structured command line inputs. In this way, each modular CLI installed on a user device can be efficiently updated/configured for use with the application within each end user's environment, independent of one another, as needed, and without the need for a technician to write configuration instructions for each type of user device. Accordingly, the embodiments described herein help to simplify system integration within existing environments.

One embodiment provides a system for providing structured command line input for application integration. The system includes an electronic processor configured to receive a request. The electronic processor is also configured to identify a configuration instruction associated with the request. The electronic processor is also configured to map the configuration instruction to a structured command line input. The electronic processor is also configured to generate a response to the request, the response including the configuration instruction.

Another embodiment provides a method for providing structured command line input for application integration. The method includes receiving a request from a customer environment. The method also includes identifying, with an electronic processor, a configuration instruction associated with the request. The method also includes mapping, with the electronic processor, the configuration instruction to a structured command line input associated with an application. The method also includes generating, with the electronic processor, a response to the request, the response including the configuration instruction.

Yet another embodiment provides a non-transitory, computer-readable medium storing instructions that, when executed by an electronic processor, perform a set of functions. The set of functions includes receiving a request from a customer environment. The set of functions also includes identifying a configuration instruction associated with the request. The set of functions also includes mapping the configuration instruction to a structured command line input. The set of functions also includes generating a response to the request, the response including the configuration instruction. The set of functions also includes transmitting the response to a customer server included in the customer environment.

Other aspects of the embodiments described herein will become apparent by consideration of the detailed description and accompanying drawings.

Figure 1:
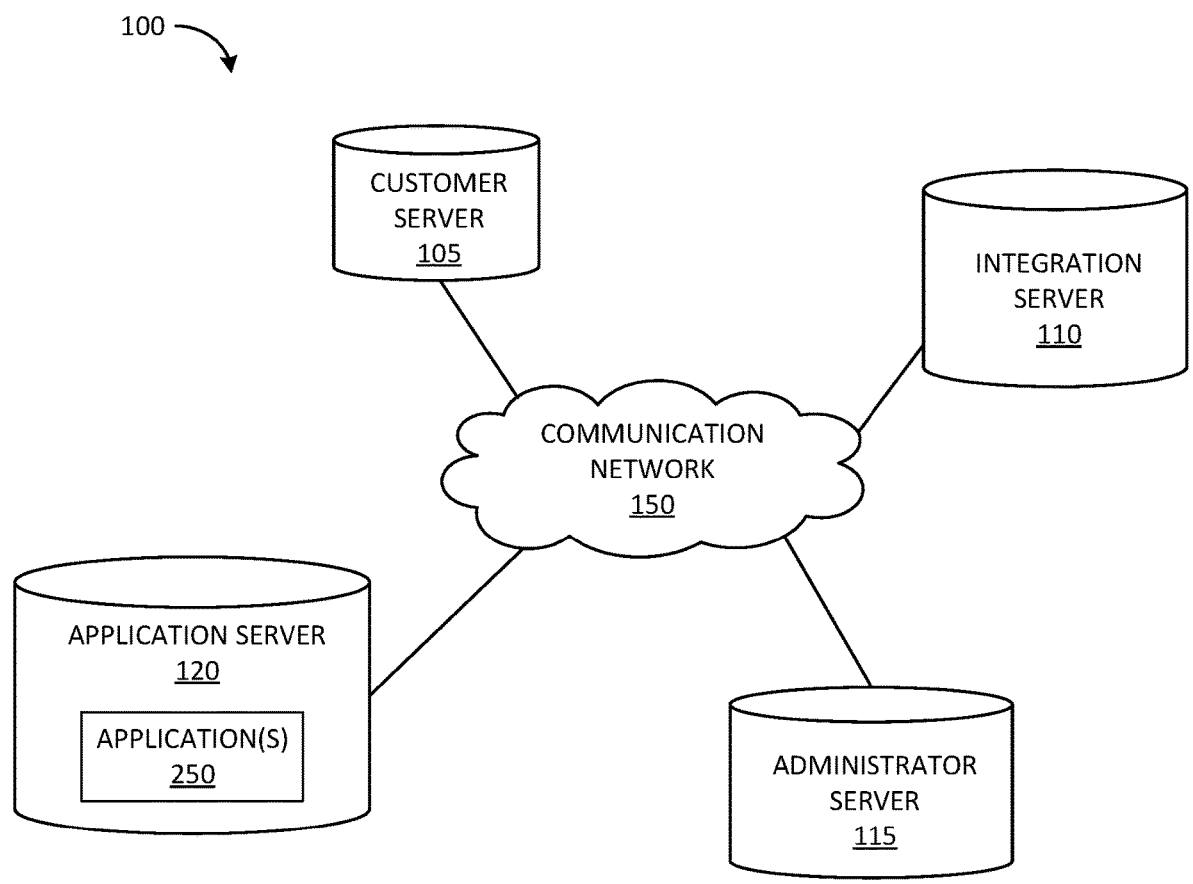
FIG. 1 is a block diagram of a system for providing structured command line input for application integration according to some embodiments.

Other aspects of the embodiments described herein will become apparent by consideration of the detailed description.

DETAILED DESCRIPTION OF THE EMBODIMENTS

Before embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. That is, the embodiments described herein illustrate possible implementations of the invention and are not to be interpreted as a comprehensive list of implementations.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 is a block diagram of a system 100 for providing structured command line input for application integration. In the variation shown, the system 100 includes a customer server 105, an integration server 110, an administrator server 115, and an application server 120. In some embodiments, the system 100 includes fewer, additional, or different components than illustrated in FIG. 1. For example, the system 100 may include multiple customer servers 105, multiple integration servers 110, multiple administrator servers 115, multiple application servers 120, or a combination thereof. Also, in some embodiments, one or more of the components of the system 100 may be distributed among multiple servers or devices, combined within a single server or device, or a combination thereof. For example, in some embodiments, the functionality associated with the administrator server 115, the application server 120, or a combination thereof, may be provided by the integration server 110. As another example, in some embodiments, the functionality provided by the application server 120 may be distributed among multiple application servers 120, such as a first application server providing a first application, a second application server providing a second application, and the like.

In the variation shown, the customer server 105, the integration server 110, the administrator server 115, and the application server 120 communicate over one or more wired or wireless communication networks 150. Portions of the communication networks 150 may be implemented using a wide area network, such as the Internet, a local area network, such as a Bluetooth™ network or Wi-Fi, and combinations or derivatives thereof. Alternatively or in addition, in some embodiments, the components of the system 100 communicate through one or more intermediary devices not illustrated in FIG. 1. Also, in some embodiments, components of the system 100 (or a portion thereof) communicate directly as compared to through the communication network 150.

Figure 2:
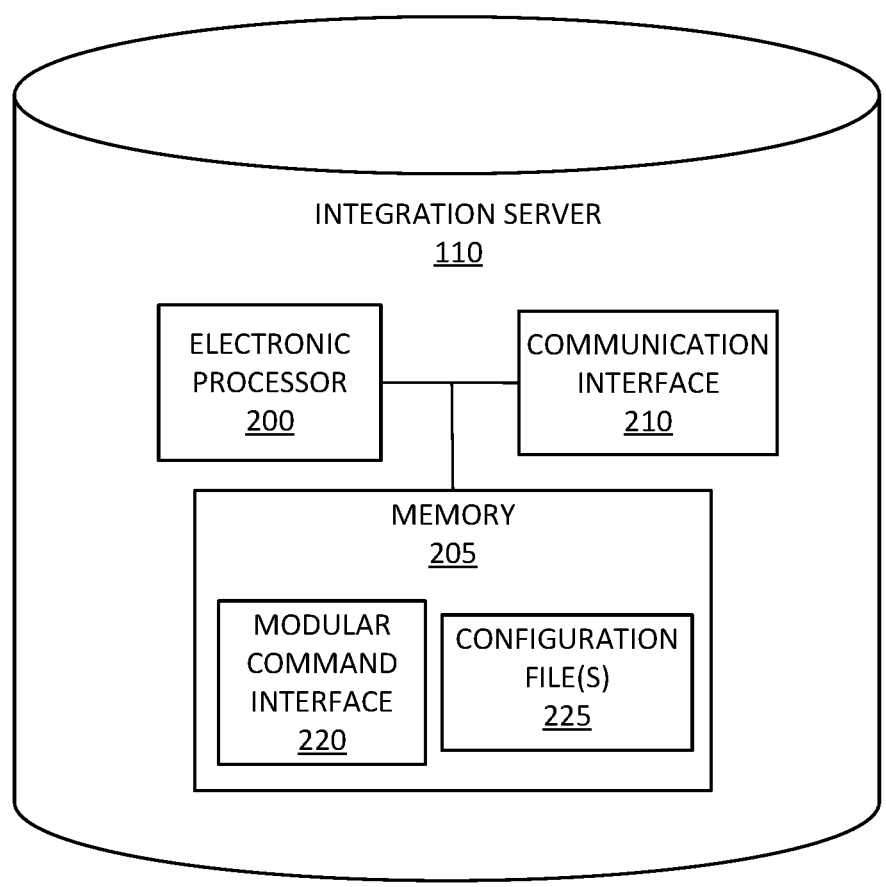
FIG. 2 is a block diagram of a server of the system of FIG. 1 according to some embodiments.

In the variation shown in FIG. 2, the integration server 110 includes an electronic processor 200 (for example, a microprocessor, an application-specific integrated circuit (ASIC), or another suitable electronic device), a memory 205 (for example, a non-transitory, computer-readable medium), and a communication interface 210. The electronic processor 200, the memory 205, and the communication interface 210 communicate wirelessly, over one or more communication lines or buses, or a combination thereof. It should be understood that the integration server 110 may include additional components than those illustrated in FIG. 2 in various configurations and may perform additional functionality than the functionality described herein. For example, in some embodiments, the functionality described herein as being performed by the integration server 110 may be distributed among servers or devices (including as part of services offered through a cloud service), may be performed by one or more customer servers 105, administrator servers 115, application servers 120, or a combination thereof. For example, in some embodiments, the modular command interface 220 functionality (or a portion thereof) is performed by the customer server 105. In such embodiments, the modular command interface 220 is locally installed or stored on the customer server 105.

In the variation shown, the communication interface 210 allows the integration server 110 to communicate with devices external to the integration server 110. For example, as illustrated in FIG. 1, the integration server 110 may communicate with the customer server 105, the administrator server 115, the application server 120, or a combination thereof through the communication interface 210. The communication interface 210 may include a port for receiving a wired connection to an external device (for example, a universal serial bus ("USB") cable and the like), a transceiver for establishing a wireless connection to an external device (for example, over one or more communication networks 150), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

For example, as illustrated in FIG. 2, the memory 205 may store a modular command interface 220. The modular command interface 220 (via the electronic processor 200 executing instructions) provides baseline command line interface (CLI) functionality. For example, the modular command interface 220 may include built in functionality, such as help, configure, version, debug, other flags, and the like. Alternatively or in addition, the modular command interface 220 (via the electronic processor 200 executing instructions) uses open specifications, such as an OpenAPI specification, to map specification paths (for example, endpoints or resources) to CLI command structure (for example, as a structured CLI input), as described in greater detail below. An API specification generally describes how an API behaves, how the API links with other APIs, and the like. An OpenAPI specification (or a standard API specification) generally refers to an API specification for an API that is standardized and publicly accessible or open for public use. In some embodiments, the modular command interface 220 uses OpenAPI specifications to map specification paths to CLI command structure automatically. In such embodiments, the OpenAPI specifications may be annotated, implemented using a specific (or correct) syntax, or a combination thereof. Accordingly, as described in greater detail below, the modular command interface 220 may perform the automatic mapping based on one or more annotations associated with an OpenAPI specification, a syntax of the OpenAPI specification, or a combination thereof.

As seen in FIG. 2, the memory 205 may also store a plurality of configuration files 225 (referred to herein collectively as "the configuration files 225" or individually as "a configuration file 225"). A configuration file 225 generally is a plain text-based file used to configure parameters and initial settings for a computer program or application. A configuration file 225 may be formatted as, for example, a json formatted configuration file, an yaml formatted configuration file, or the like. A configuration file 225 may be associated with a specific product, solution, or application, such as an application 250 stored in the application server 120. Accordingly, in some embodiments, the integration server 110 may receive a configuration file 225 from the administrator server 115, where the configuration file 225 is a single line of configuration usable by the customer server 105 for integrating an environment of the customer server 105 with an application 250 associated with the configuration file 225.

The integration server 110 may receive the configuration files 225 from the administrator server 115. The administrator server 115 may be a computing device, such as a desktop computer, a terminal, a workstation, a laptop computer, a tablet computer, a mobile device, or the like. The administrator server 115 may be used by an administrator, such as an application or product administrator, or another user for generating a configuration file 225. For example, an administrator may generate and transmit a configuration file 225 to the integration server 110 for a product, solution, or application such that the product, solution, or application may be integrated with or leveraged by an environment of a customer (for example, an environment of the customer server 105). In other words, new solutions, products, or applications may be made available for integration with a customer's environment ad hoc through the generation of a configuration file 225 associated with the new solution, product, or application.

As seen in the variation illustrated in FIG. 1, the application server 120 stores and provides a plurality of applications 250 (referred to herein collectively as "the applications 250" and individually as "an application 250"). An application 250 may also be referred to herein as a product or a solution. An application 250 may be a web application providing security or anti-fraud functionality, such as fraud detection, fraud monitoring, and the like. For example, an application 250 may support account takeover prevention, fraudulent account creation prevention, and the like. Alternatively or in addition, an application 250 may be a web application providing additional or different functionality unrelated to security and anti-fraud functionality. In some embodiments, the application server 120 supports multiple applications 250. However, in other embodiments, the system 100 may include multiple application servers 120 each providing a different application 250. For example, in such embodiments, the system 100 may include a first application server 120 providing an account takeover prevention application (a first application 250), a second application server 120 providing an online account origination application (a second application 250), and the like.

The customer server 105 may be a computing device, such as a desktop computer, a terminal, a workstation, a laptop computer, a tablet computer, a mobile device, or the like. The customer server 105 may provide an application (or service) to a user or customer (for example, an end user, a group of users, an organization, another user entity, and the like). The user may interact with the customer server 105 either directly or indirectly via one or more intermediary devices (not shown). In some embodiments, the customer server 105 is part of a computing network, such as a distributed computing network, a cloud computing service, or the like. In such embodiments, the customer server 105 may communicate with the integration server 110, the administrator server 115, the application server 120, or a combination thereof as part of providing a cloud-based service to a user using an intermediary device (not shown). Alternatively or in addition, the customer server 105 may be a user device used directly by a user to interact with the integration server 110, the administrator server 115, the application server 120, or a combination thereof.

The customer server 105 may interact with the integration server 110 to integrate with or leverage one or more of the applications 250. In some embodiments, the customer server 105 interacts with the integration server 110 by transmitting a request to the integration server 110. A request may be associated with a service or application run within the customer environment. Accordingly, the request may be associated with an application specification of the customer environment. In some embodiments, the request is associated with an OpenAPI specification or a standard API specification.

Alternatively or in addition, the customer server 105 interacts with the integration server 110 by receiving a response to the request from the integration server 110. The response may include, for example, a structured command line input associated with the specific application, product, or solution. For example, the response may include one or more lines of configuration (as specified by a configuration file 225) usable by the customer server 105 for integrating a customer environment of the customer server 105 with the specific application, product, or solution. In other words, by interacting with the integration server 110, the customer server 105 may be able to run one or more CLI commands within a customer environment of the customer server 105 (in order to access and interact with one or more of the applications 250) without performing a complex application integration. As one example, where the request includes "HTTP GET/score", the structured command line input may be "aion td get-score" (where "td" stands for trusted device).

Although not illustrated, the customer server 105, the administrator server 115, and the application server 120 may include similar components as the integration server 110 (an electronic processor, a memory, and a communication interface). However, in some embodiments, the customer server 105, the administrator server 115, the application server 120, or a combination thereof includes additional, fewer, or different components than the integration server 110. For example, although not illustrated, the customer server 105, the administrator server 115, the application server 120, or a combination thereof may include a human-machine interface including one or more input devices, one or more output devices (for example, a display device), or a combination thereof.

Figure 3:
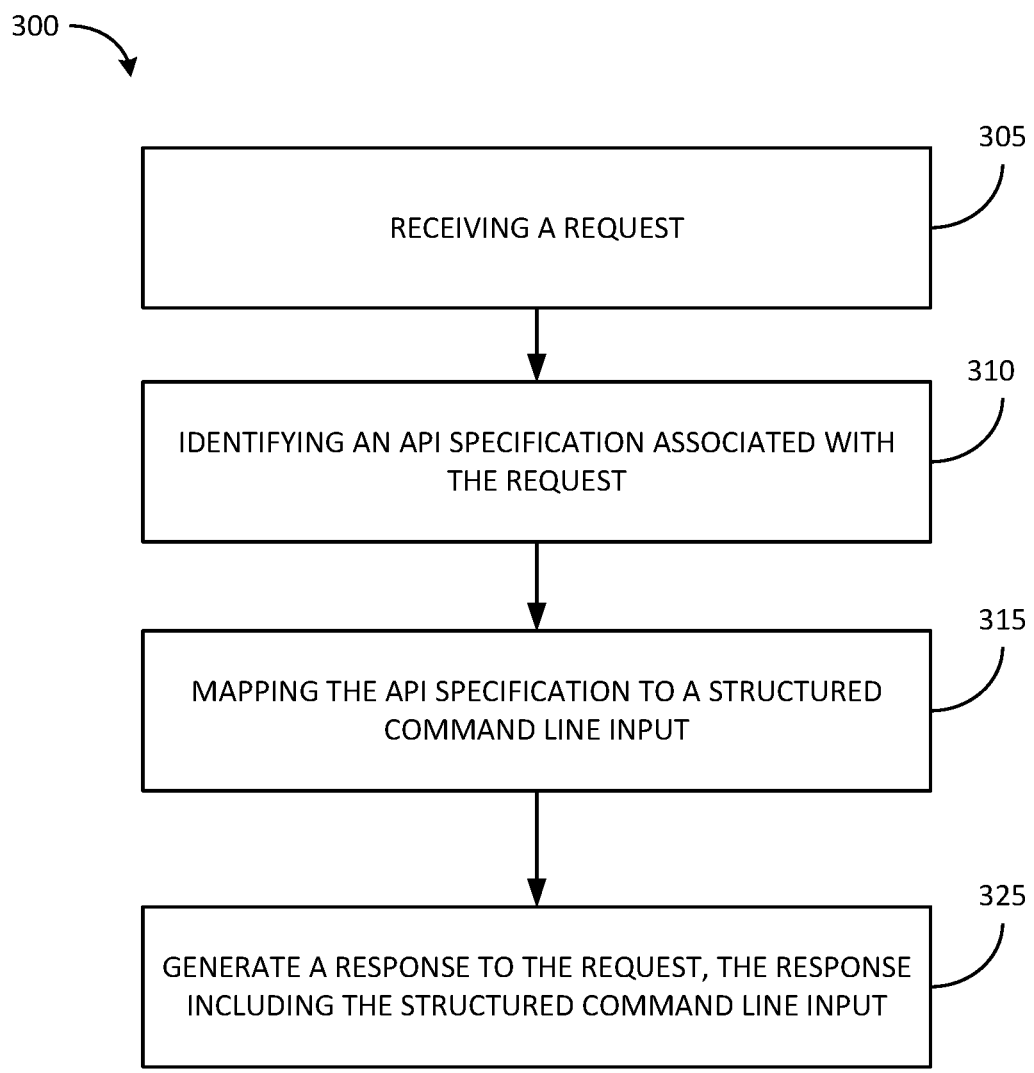
FIG. 3 is a flow chart of a method of providing structured command line input for application integration using the system of FIG. 1 according to some embodiments.

FIG. 3 is a flowchart illustrating a method 300 for providing command line inputs for application integration according to some embodiments. The method 300 is described herein with reference to FIG. 4. The method 300 is described herein as being performed by the integration server 110 (the modular command interface 220 via the electronic processor 200 executing instructions). However, as noted above, the functionality performed by the integration server 110 (or a portion thereof) may be performed by other devices (via an electronic processor executing instructions), including, for example, the customer server 105 (e.g a client device such as a mobile phone or a desktop computer), the administrator server 115, the application server 120, or a combination thereof. The method 300 may also be performed in a different order than the order shown. Further, the actions enumerated in the method 300 shown may be distributed among devices in a different way, as will be described in greater detail below.

Figure 4:
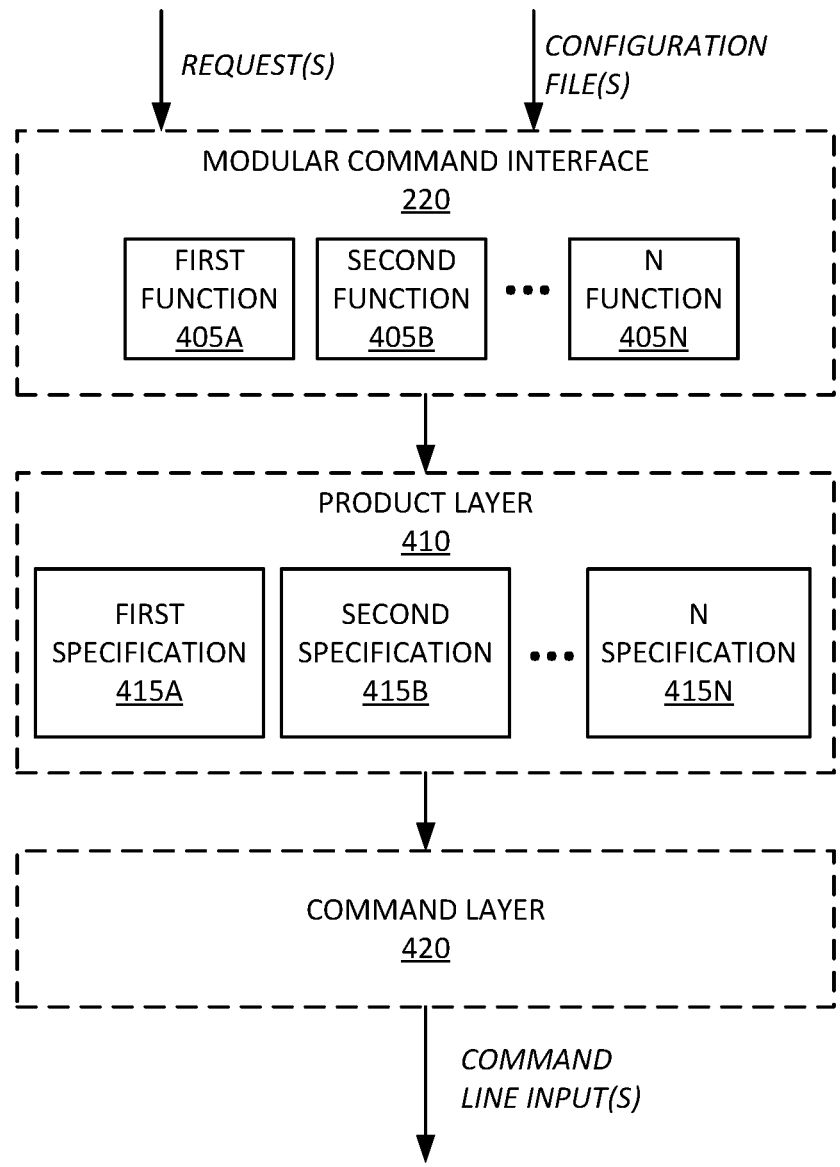
FIG. 4 illustrates a workflow of the system of FIG. 1 when performing the method of FIG. 3 according to some embodiments.

As seen in FIG. 3, the illustrated method 300 includes receiving, with the electronic processor 200, a request (at block 305). As seen in FIG. 4, the modular command interface 220 (the electronic processor 200 executing instructions) receives the request. In some embodiments, the request is received from the customer server 105 (or a customer environment). As also seen in FIG. 4, the modular command interface 220 may provide basic command line functionality (for example, a first function 405A, a second function 405B, and the like). The basic command line functionality provided by the modular command interface 220 may include, for example, help, configure, version, debug, other flags, and the like.

In the variation shown, the electronic processor 200 identifies an API specification associated with the request (at block 310), after receiving the request (at block 305). As noted above, a request may be associated with a service or application run within the customer environment. In some embodiments, the request may be associated with an application specification of the customer environment. For example, as illustrated in FIG. 4, a product layer 410 may include one or more application (or API) specifications (for example, a first specification 415A, a second specification 415B, and the like).

The electronic processor 200 may then map the API specification to a structured command line input (at block 315). The structured command line input may include one or more lines of configuration for integrating an application 250 with a customer environment (based on, for example, the API specification). In other words, the structured command line input enables the integration of an application 250 with the customer environment. For example, as illustrated in FIG. 4, after the product layer 410, the method 400 moves to a command line layer 420. Within the command line layer 420, the electronic processor 200 determines a structured command line input corresponding to the API specification.

In some embodiments, the modular command interface 220 uses OpenAPI specifications to map specification paths (for example, API specifications) and CLI command structure automatically. In such embodiments, the OpenAPI specifications may be annotated, implemented using a specific (or correct) syntax, or a combination thereof. Accordingly, the modular command interface 220 may perform the automatic mapping based on one or more annotations associated with an OpenAPI specification, a syntax of the OpenAPI specification, or a combination thereof. As one example, with respect to syntax, when the http request is similar to "HTTP GET/score", the request may be automatically represented as "get-score." For a full command, it may be represented as "aion td get-score" (where "td" stands for trusted device and, in this example, the trusted device was previously installed). Alternatively or in addition, the OpenAPI specification may be annotated with metadata for performing semi-automatic mapping. The modular command interface 220 may perform the mapping based on annotations when a direct mapping using syntax is not determinable.

The electronic processor 200 then generates a response to the request (at block 325). The response may include the structured command line input as determined at block 320. For example, as seen in FIG. 4, after determining the structured command line input within the command line layer 420, the response is generated and outputted. In some embodiments, the electronic processor 200 transmits the response to the customer server 105 such that the structured command line input may be used with a product, application, or solution (for example, an application 250) within the customer environment.

In response to receiving the response, the customer server 105 (via an electronic processor of the customer server 105) may install or run or execute the structured command line input within the customer's environment or system. By executing the structured command line input, the customer server 105 is able to integrate with and leverage application functionality provided by an application 250 associated with the structured command line input. As one example, by installing and executing the structured command line input, an API, such as an API associated with an application 250, may be installed (for example, by pointing to an OpenAPI Specification for the API) and run within the customer's environment, such that the application 250 may be integrated within the customer environment of the customer server 105 without performing a complex application integration. As one example, when the structured command line input is "aion td get-udid", the response to executing this structured command line input may be {"udid": "udid-r72di2ni2dj19xq"}.

Figure 5:
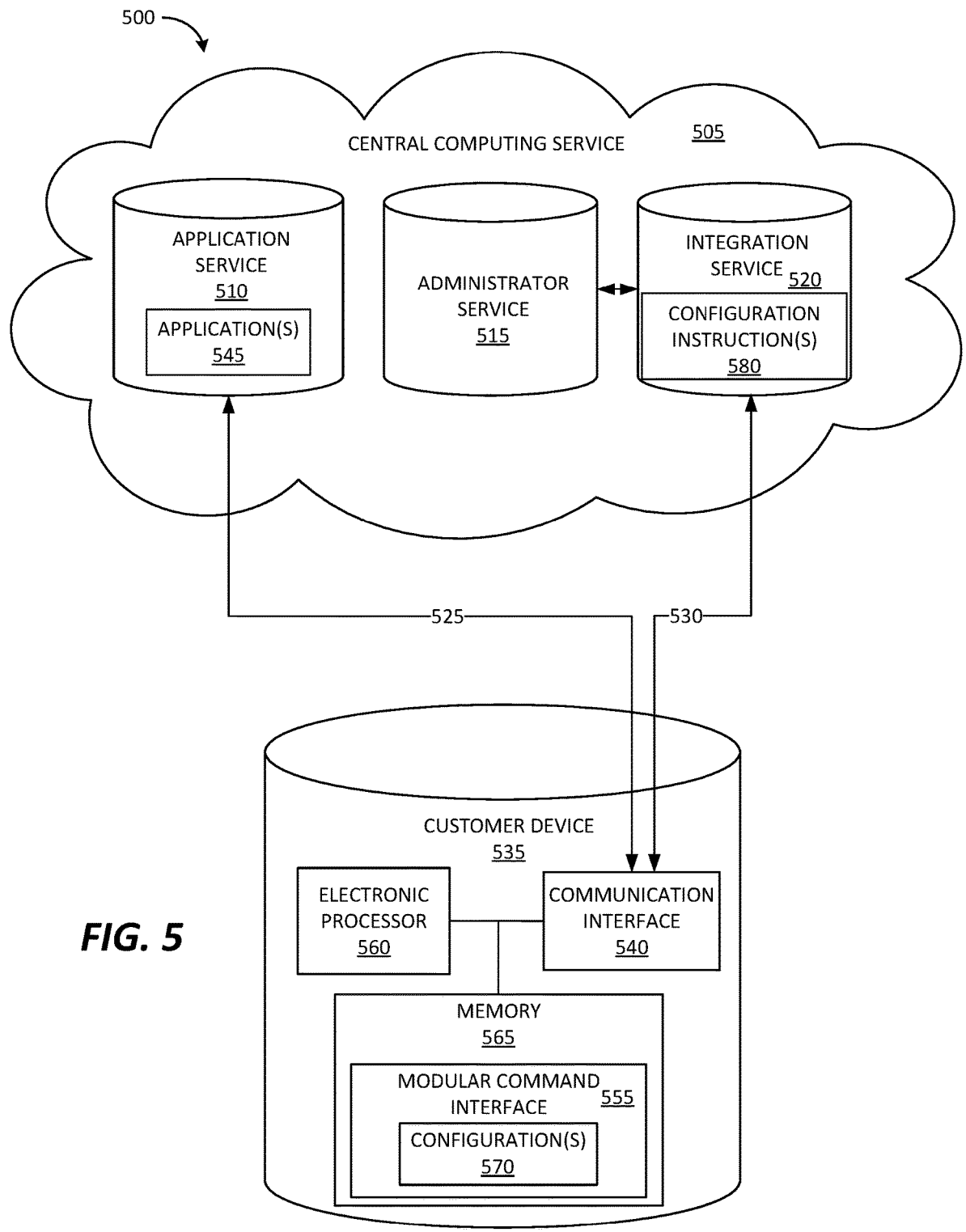
FIG. 5 is a block diagram of another system for providing structured command line input for application integration according to some embodiments.

FIG. 5 is a block diagram of another system 500 for providing structured command line input for application integration according to some embodiments. A central computing service 505 including an application service 510, an administrator service 515, and an integration service 520 is configured to service application requests 525 and integration requests 530 communicated by a customer device 535 via a communication interface 540.

In the variation shown, the application service 510 is configured to provide functions supported by an application 545 to the customer device 535 in response to the application request 525 by the customer device 535. In the variation shown, the customer device 535 includes a modular command interface 555, and the application request is generated using the modular command interface 555.

In embodiments, the customer device 535 may include a fintech device upon which the modular command interface 555 is installed. The customer device 535 may be configured to process payments, authenticate payments, produce receipts, convert currency, determine a location of the customer device 535, and prevent fraud. For example, the customer device 535 may be a credit card or debit card terminal (e.g. a desktop or mobile payment terminal), an ATM machine, a train turnstile, a tollway collection device, etc. The customer device 535 includes an electronic processor 560, a communication interface 540, and a memory 565. The modular command interface 555 of the customer device 535 operates according to a configuration 570. The configuration 570 of the modular command interface 555 determines a set of structured command inputs that the modular command interface 555 can interpret. In turn, by executing the modular command interface 555, the electronic processor 560 is enabled to interpret and execute structured command line input according to the configuration 570. For example, the modular command interface 555 may, in some cases, only produce a request acceptable to the application service 510 if the configuration 570 of the modular command interface 555 aligns with the input requirements of application 545. That is, the customer device 535 may submit structured command line input to the electronic processor 560 via the modular command interface 555 for the purpose of accessing an application 545 provided by an application service 510. In response, the application service 510 might only service the application request 525 if the application request 525 aligns with the input requirements of application 545.

The integration service 520 is configured to provide configuration instructions 580 to the customer device 535 in response to an integration request 530. For example, the integration request may specify a particular API specification that the modular command interface is to be configured according to. In such a case, the integration service 520 determines a mapping between the desired API specification and configuration instructions 580 that will configure the modular command interface to properly communicate (e.g. make requests and interpret responses according to the desired API specification) with the application service 510.

In the variation shown, the electronic processor 560 produces an integration request 530 in response to a structured command line input to the modular command interface 555. For example, a structured command line input configured to cause the modular command interface 555 to generate an integration request 530 may be "modularcommandline.exe configure install-service-name trusted-device-openapi-spec https://api.[OpenAPI specification url]". The electronic processor 560 communicates the integration request 530 to the integration service 520 via the communication interface 540. The integration service 520 interprets the integration request 530 by mapping the request to a set of configuration instructions 580. The integration service 520 then responds to the integration request 530 by communicating configuration instructions 580 to the customer device 535. For example, the integration service 520 may communicate an amended or unamended version of the requested OpenAPI specification to the customer device 535 in response to the integration request 530. The modular command interface 555 of the customer device 535 consumes the OpenAPI specification and interprets it as configuration instructions 580. The modular command interface 555 then modifies configuration 570 by mapping paths in the consumed OpenAPI specification to a structured command line input, and configuring the modular command interface to accept and execute the structured command line input. In some embodiments, the configuration instructions 580 are an OpenAPI specification contained in a yaml or json file. In such embodiments, the modular command interface 555 interprets the file as configuration instructions 580, modifying configuration 570 according to the OpenAPI specification contained in the file.

The administrator service 515 is configured to produce configuration instructions 580. In some embodiments, the administrator service 515 produces configuration instructions 580 in the form of a json or yaml file containing a new OpenAPI specification. The administrative service 515 communicates the configuration instructions 580 to the integration service 520 where the configuration instructions 580 are held for request by the customer device 535. Additionally, an administrative technician may produce configuration instructions 580 on a case-by-case customer service basis or for large rollouts of a particular products or APIs. For example, application service 510 may be updated to contain a new application 545 that operates according to a new OpenAPI specification. In such a case, the administrator service 515 may produce a yaml or json file containing the OpenAPI specification and communicate the file to the integration service 520. The integration service 520 may then map the syntax or annotations of the yaml or json file to a structured command line input, and store the yaml or json file as configuration instructions 580 to be communicated to a customer device 535 in response to an integration request 530 specifying the OpenAPI specification stored as configuration instructions 580. Upon installing or executing the configuration instructions 580, the modular command interface 555 is configured to use the structured command line input with the benefit of the mapping performed by the integration service 520. In this way, the modular command interface 555 enables a variety of customer devices to be configured with a single line of structured command line input submitted to the modular command interface 555.

Thus, the embodiments described herein provide, among other things, methods and systems for providing structured command line input for application integration. Various features and advantages of the invention are set forth in the following claims.

What is claimed is:

1. A system for providing a configuration instruction for application integration, the system comprising:
 an electronic processor configured to:
  receive a request from a client device;
  identify a configuration instruction associated with the request;
  automatically map the configuration instruction to a structured command line input associated with an application, the configuration instruction being configured to cause a modular command interface to accept and execute the structured command line input wherein mapping the configuration instruction to the structured command line input includes mapping a path of an OpenAPI specification to the structured command line input based on a syntax of the OpenAPI specification;

generate a response to the request, the response including the configuration instruction; and transmit the response to a client server.

2. The system of claim 1, wherein the configuration instruction is associated with the client device.

3. The system of claim 1, wherein, in response to receiving the response, the client server is configured to execute the configuration instruction.

4. The system of claim 3, wherein, in response to executing the configuration instruction, an application programming interface (API) is installed and executed by the client server for accessing the application associated with the structured command line input.

5. The system of claim 1, wherein mapping the configuration instruction to the structured command line input includes mapping a path of an OpenAPI specification to the structured command line input based on an annotation of the OpenAPI specification.

6. A method for providing a configuration instruction for application integration, the method comprising:

receiving a request from a client device;

identifying, with an electronic processor, a configuration instruction associated with the request;

automatically mapping, with the electronic processor, the configuration instruction to a structured command line input associated with an application, the configuration instruction being configured to cause a modular command interface to accept and execute the structured command line input wherein mapping the configuration instruction to the structured command line input includes mapping a path of an OpenAPI specification to the structured command line input based on a syntax of the OpenAPI specification;

generating, with the electronic processor, a response to the request, the response including the configuration instruction; and transmit the response to a client server.

7. The method of claim 6, wherein mapping the configuration instruction to the structured command line input includes mapping a path of an OpenAPI specification to the structured command line input based on an annotation of an OpenAPI specification.

8. The method of claim 6, wherein, in response to receiving the response, the client server is configured to execute the configuration instruction.

9. The method of claim 8, wherein, in response to executing the configuration instruction, an application programming interface (API) is installed and executed by the client server for accessing the application associated with the structured command line input.

10. The method of claim 6, wherein identifying the configuration instruction includes identifying an application programming interface (API) specification associated with the client device.

11. A non-transitory, computer-readable medium storing instructions that, when executed by an electronic processor, perform a set of functions, the set of functions comprising:

receiving a request from a client device;

identifying a configuration instruction associated with the request;

automatically mapping the configuration instruction to a structured command line input associated with an application, the configuration instruction being configured to cause a modular command interface to accept and execute the structured command line input wherein mapping the configuration instruction to the structured command line input includes mapping a path of an OpenAPI specification to the structured command line input based on a syntax of the OpenAPI specification;

generating a response to the request, the response including the configuration instruction; and transmitting the response to a client server.

12. The computer-readable medium of claim 11, wherein, in response to receiving the response, the client server is configured to execute the configuration instruction.

13. The computer-readable medium of claim 12, wherein, in response to executing the configuration instruction, an application programming interface (API) is installed and executed by the client server for accessing the application associated with the structured command line input.

14. The computer-readable medium of claim 11, wherein mapping the configuration instruction to the structured command line input includes mapping a path of an OpenAPI specification to the structured command line input based on an annotation of an OpenAPI specification.

\* \* \* \* \*